United States Patent
Menez et al.

(10) Patent No.: US 10,476,184 B2
(45) Date of Patent: Nov. 12, 2019

(54) DEVICE FOR ELECTRICAL CONNECTION AND COOLING THEREOF

(71) Applicant: Delphi International Operations Luxembourg S.A.R.L., Bascharage (LU)

(72) Inventors: Frederic Menez, Hermeray (FR); Jean Fabre, Chartres (FR); Stephane Lacote, Chartres (FR)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 16/106,427

(22) Filed: Aug. 21, 2018

(65) Prior Publication Data

US 2019/0067843 A1   Feb. 28, 2019

(30) Foreign Application Priority Data

Aug. 29, 2017   (FR) ..................................... 17 57940

(51) Int. Cl.
| | |
|---|---|
| *H01R 11/28* | (2006.01) |
| *H01R 13/00* | (2006.01) |
| *H01M 2/20* | (2006.01) |
| *H01M 2/30* | (2006.01) |
| *H01M 10/625* | (2014.01) |
| *H01M 10/613* | (2014.01) |
| *H01M 10/6553* | (2014.01) |

(Continued)

(52) U.S. Cl.
CPC ............ *H01R 11/288* (2013.01); *B60L 58/26* (2019.02); *H01M 2/206* (2013.01); *H01M 2/30* (2013.01); *H01M 10/613* (2015.04); *H01M 10/625* (2015.04); *H01M 10/6553* (2015.04); *H01M 10/6556* (2015.04); *H01R 13/005* (2013.01); *B60L 2240/545* (2013.01); *H01M 10/6567* (2015.04); *H01M 2220/20* (2013.01); *H01R 31/08* (2013.01); *H01R 2201/26* (2013.01)

(58) Field of Classification Search
USPC .......................................................... 439/505
See application file for complete search history.

(56) References Cited

U.S. PATENT DOCUMENTS

| | | | | |
|---|---|---|---|---|
| 9,287,646 B2 * | 3/2016 | Mark | ................... | H01R 13/005 |
| 9,324,986 B2 * | 4/2016 | Ahn | ...................... | H01M 2/305 |

(Continued)

FOREIGN PATENT DOCUMENTS

| | | |
|---|---|---|
| EP | 2879228 A1 | 6/2015 |
| FR | 1067787 A | 6/1954 |

(Continued)

*Primary Examiner* — Alexander Gilman
(74) *Attorney, Agent, or Firm* — Robert J. Myers

(57) ABSTRACT

An electrical connection shunt assembly is designed to be coupled electrically between two electrical contact terminal connectors. The assembly includes a set of electrical current conduction elements. The set of conduction elements comprising a first terminal and a second terminal designed to be coupled with a first and a second electrical contact terminal connectors, an electrical coupling element for the first and second terminals designed to allow electrical current flow from a first terminal to the second terminal. At least one of the conduction elements comprises a shunt conduit that is arranged through the conduction element so as to have a coolant flow therein.

8 Claims, 4 Drawing Sheets

(51) Int. Cl.
    *H01M 10/6556*    (2014.01)
    *B60L 58/26*       (2019.01)
    *H01R 31/08*     (2006.01)
    *H01M 10/6567*   (2014.01)

(56) References Cited

U.S. PATENT DOCUMENTS

| | | | | |
|---|---|---|---|---|
| 2006/0270286 A1* | 11/2006 | Zhao | H01M 2/206 | 439/840 |
| 2009/0123820 A1* | 5/2009 | Han | H01M 2/204 | 429/121 |
| 2013/0137313 A1* | 5/2013 | Casses | B60L 3/0069 | 439/851 |
| 2013/0143450 A1* | 6/2013 | Casses | H01M 2/206 | 439/816 |
| 2013/0267115 A1* | 10/2013 | Mark | H01R 13/005 | 439/485 |
| 2013/0303006 A1* | 11/2013 | Casses | H01R 13/7032 | 439/135 |

FOREIGN PATENT DOCUMENTS

| | | | |
|---|---|---|---|
| FR | 3029361 | A1 | 6/2016 |
| WO | 2012051510 | A2 | 4/2012 |

* cited by examiner

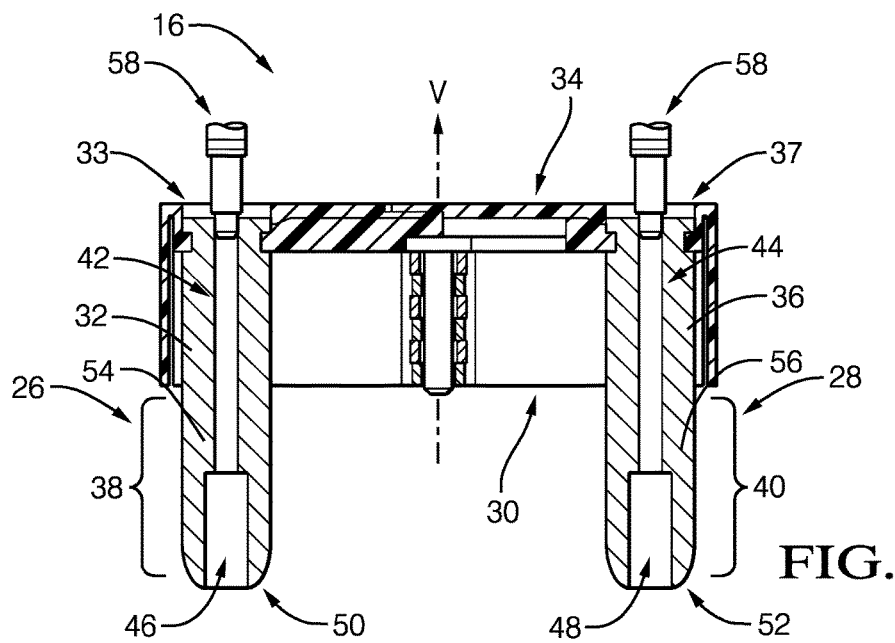
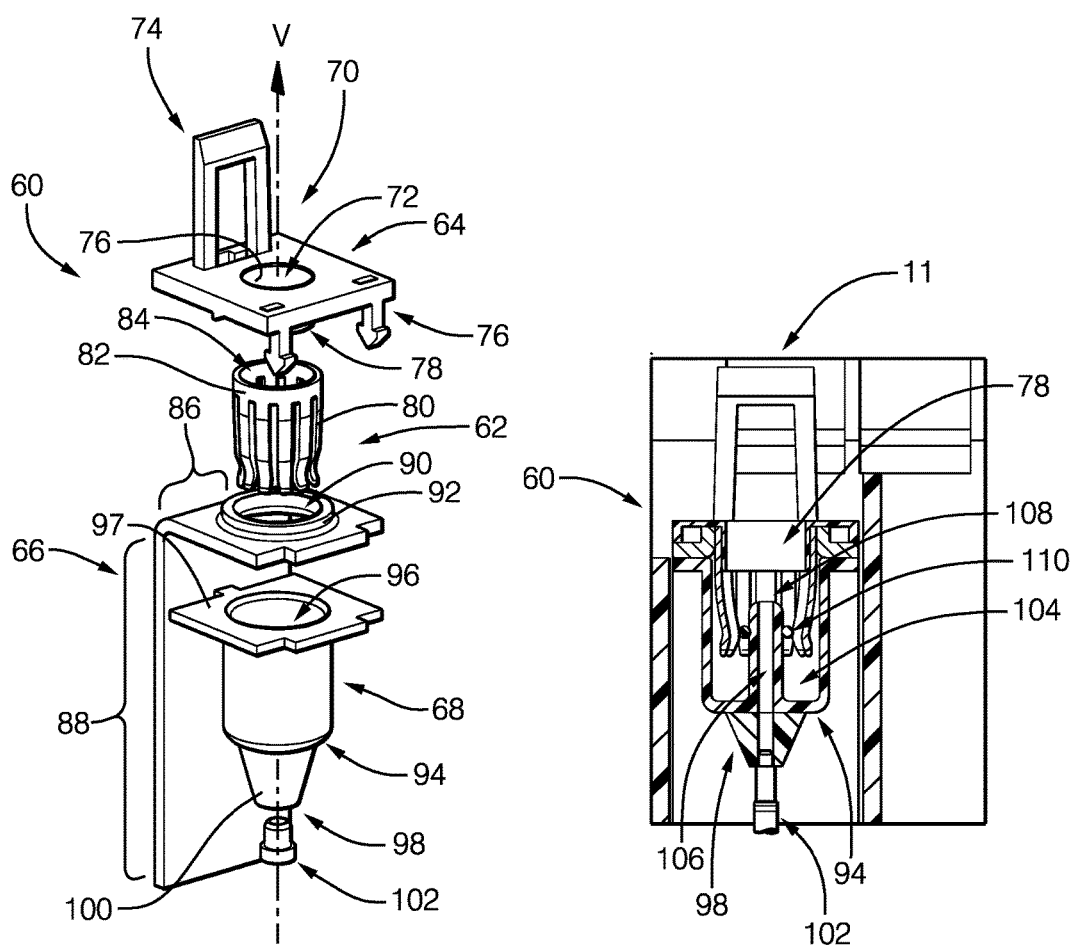

DEVICE FOR ELECTRICAL CONNECTION AND COOLING THEREOF

CROSS-REFERENCE TO RELATED APPLICATION

This application claims the benefit under 35 U.S.C. § 119(a) of Patent Application No. 1757940 filed in the Institut National de la Propriété Industrielle (French Patent Office) on Aug. 29, 2017, the entire disclosure of which is hereby incorporated by reference.

TECHNICAL FIELD OF THE INVENTION

The present invention relates to an electrical connection device and its cooling circuit, more particularly the present invention relates to an electrical connection shunt and its electrical contact terminal connectors comprising a cooling circuit.

BRIEF DESCRIPTION OF THE SEVERAL VIEWS OF THE DRAWING

The present invention will now be described, by way of example with reference to the accompanying drawings, in which:

FIG. 4 is a schematic view in axial cross section of the shunt according to FIG. 2;

FIG. 5 is a perspective exploded schematic view of a first embodiment of an electrical contact terminal connector designed to receive an electrical connection terminal of the shunt according to FIG. 2;

FIG. 6 is a schematic view in axial cross section of the electrical contact terminal connector assembled according to FIG. 5 and mounted on a battery element.

DETAILED DESCRIPTION OF THE INVENTION

Figure 1:
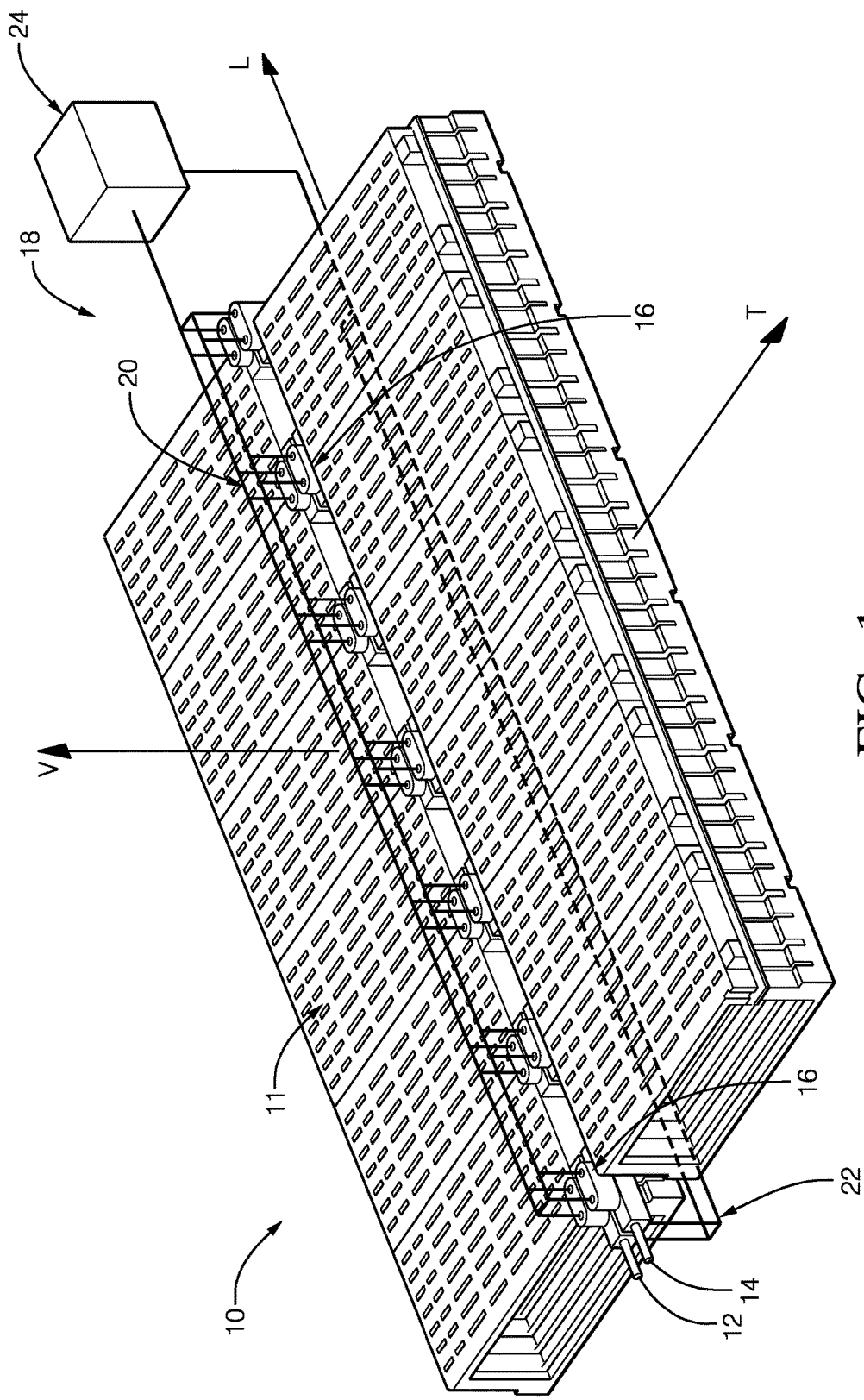
FIG. 1 is a perspective schematic view of a battery pack comprising battery elements connected electrically to one another by an electrical connection shunt according to the first embodiment of the invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

An electrical connection shunt, designed to be coupled electrically between two electrical contact terminal connectors, comprises a set of electrical current conduction elements, said set of conduction elements comprising a first terminal and a second terminal, extending along a vertical axis, and designed to be coupled with a first and a second electrical contact terminal connectors and designed to make an electrical current flow between each electrical contact terminal connector and the electrical connection terminal coupled to the electrical contact terminal connector. An electrical coupling element for the two electrical connection terminals is designed to make the electrical current flow from one electrical connection terminal to the other electrical connection terminal. At least one of the conduction elements comprises a shunt conduit arranged through the conduction element so as to have a coolant flow therein. The coolant makes it possible to reduce the heating of the conduction elements of the shunt, and makes it possible to maintain a reasonable shunt size.

The shunt conduit can be an open-ended conduit of which at least one end comprises a shunt interconnection means designed to couple a coolant pipe thereto. The coolant pipe makes it possible to channel the path of a coolant such as air or an aqueous element. The shunt conduit can be a rectilinear conduit.

The first terminal can be a male electrical connection terminal comprising an overall cylindrical contact end designed to be inserted into the first electrical contact terminal connector. The shunt conduit can be arranged through the first terminal and can extend along the vertical axis. The contact end of the first electrical terminal can comprise an internal cavity arranged in fluid continuity with the shunt conduit so as to be able to insert therein another conduit making the coolant flow in continuity with the shunt conduit. The second terminal can comprise the same features as the first terminal.

An electrical contact terminal connector designed to receive an electrical connection of an electrical connection shunt comprises an electrical coupling terminal designed to be coupled electrically with said electrical connection terminal of the shunt. A terminal connector conduit is arranged through the contact terminal connector so as to have a coolant flow therein. The coolant makes it possible to reduce the heating of the contact terminal connector, and makes it possible to maintain a reasonable contact terminal connector size.

The terminal connector conduit can be an open-ended conduit of which at least one end of the conduit comprises a terminal connector interconnection means designed to couple another coolant pipe thereto. The coolant pipe makes it possible to channel the path of the coolant such as air or an aqueous element. The terminal connector conduit can be a rectilinear conduit. The electrical coupling terminal can be a female electrical terminal extending along a vertical axis and comprising an overall cylindrical contact sleeve extending along the vertical axis and designed to receive the electrical connection terminal of the shunt.

A housing can cover the cylindrical wall of the contact sleeve, the housing comprising a housing bottom through which is arranged the terminal connector conduit extending along the vertical axis. A hollow piece can be arranged on the housing bottom, the hollow piece extending along the vertical axis from the housing bottom to the interior of the contact sleeve so as to be able to be inserted into an internal cavity of the contact end of the male electrical connection terminal of the shunt, and forming the terminal connector conduit so as to allow the circulation of the coolant.

The piece can comprise a seal arranged around the piece, the seal being designed to be compressed tightly between the internal cavity and the piece. The housing bottom can comprise a coolant extraction duct forming the terminal connector conduit and extending downwards along the vertical axis.

An electrical assembly comprising the electrical connection shunt and the electrical contact terminal connector, both described above, comprises the first terminal of the shunt coupled electrically with the coupling terminal of the first electrical contact terminal connector.

The shunt conduit can be in fluid continuity with the terminal connector conduit. The assembly can comprise a first coolant pipe fixed in fluid continuity with the shunt conduit and a second coolant pipe fixed in fluid continuity with the terminal connector conduit. At least one of the coolant pipes can be fixed at one of its ends to a pump allowing the circulation of the coolant.

The assembly of the second terminal of the shunt with the electrical coupling terminal of the second electrical contact terminal connector can comprise the same features as the assembly of the first terminal of the shunt with the electrical coupling terminal of the first electrical contact terminal connector.

In order to facilitate the description, and in a nonlimiting manner, an orthogonal reference frame comprising a longitudinal axis L, a transverse axis T and a vertical axis V is defined. "Down", "up", "above", "below", "bottom" and "top" orientations are defined according to the vertical direction. "Left", "right" and "lateral" orientations are defined according to the transverse direction. "Front" and "rear" orientations are also defined according to the longitudinal direction.

According to FIG. 1, an assembly 10 of battery elements 11 designed to be embedded in a hybrid vehicle or in an electrical vehicle is represented. In order to limit bulk, the battery elements 11 are arranged in two longitudinal adjacent rows. The assembly 10 of the battery elements 11 comprises, at one of its two transverse ends, a positive contact point 12 and a negative contact point 14 between which the overall voltage of the assembly 10 of the battery elements 11 is delivered.

According to the embodiment represented, the assembly 10 of the battery elements 11 comprises twelve battery elements 11, each row comprising six battery elements 11. The battery elements 11 are mounted in series, which means that the positive pole of the first battery element is connected to the negative pole of the second battery element, the positive pole of the second battery element is connected to the negative pole of the third battery element, and so on, to the twelfth battery element for which the positive pole is linked electrically to the positive contact point 12 of the assembly 10 of battery elements 11. The negative pole of the first battery element is linked electrically to the negative contact point 14 of the assembly 10 of battery elements 11.

According to the embodiment represented, the electrical connection between the positive poles and the negative poles of the battery elements 11 is made using electrical connection shunts, hereinafter referred to as shunts 16. In particular, the shunts 16 are arranged between the two rows of battery elements 11. This arrangement makes it possible in particular to arrange at the end opposite the positive 12 and negative 14 contact points, a shunt 16 connected between the positive pole of the sixth battery element and a terminal connector of a protection fuse of the assembly 10 of battery elements 11, and also another shunt 16 connected between the negative pole of the seventh battery element and the other terminal connector of the fuse.

Also, according to this embodiment, each contact point 12, 14 is linked electrically to its battery element by a shunt 16.

When the assembly 10 of battery elements 11 is solicited, a very high electrical current, for example of the order of four hundred amperes, can be made to flow through each shunt 16. The electrical current flowing in each shunt 16 creates a heating thereof. One of the ways of reducing the heating of the shunts 16 is to cool them.

According to the embodiment represented, a cooling circuit 18 of the shunts 16 is implemented. The cooling circuit 18 comprises supply coolant pipes 20 and return coolant pipes 22 making it possible to have a coolant, such as air, a gas, water or any other liquid, flow through the shunts 16. More particularly, a supply coolant pipe 20 supplying the shunts 16 with coolant and a return coolant pipe 22 for recovering the fluid having passed through the shunts 16 will be identified.

The cooling circuit 18 also comprises a pump 24 that makes it possible to inject the coolant into the supply coolant pipes 20 of the shunts 16. According to this embodiment, the return coolant pipe 22 makes it possible to reinject the fluid into the pump 24. The pump 24 can comprise a device making it possible to cool the duly recovered fluid so as to reinject it into the cooling circuit 18.

In an exemplary and nonlimiting manner, a fan creating a flow of air in the supply coolant pipes 20 and return coolant pipes 22 can serve as pump 24.

Figure 2:
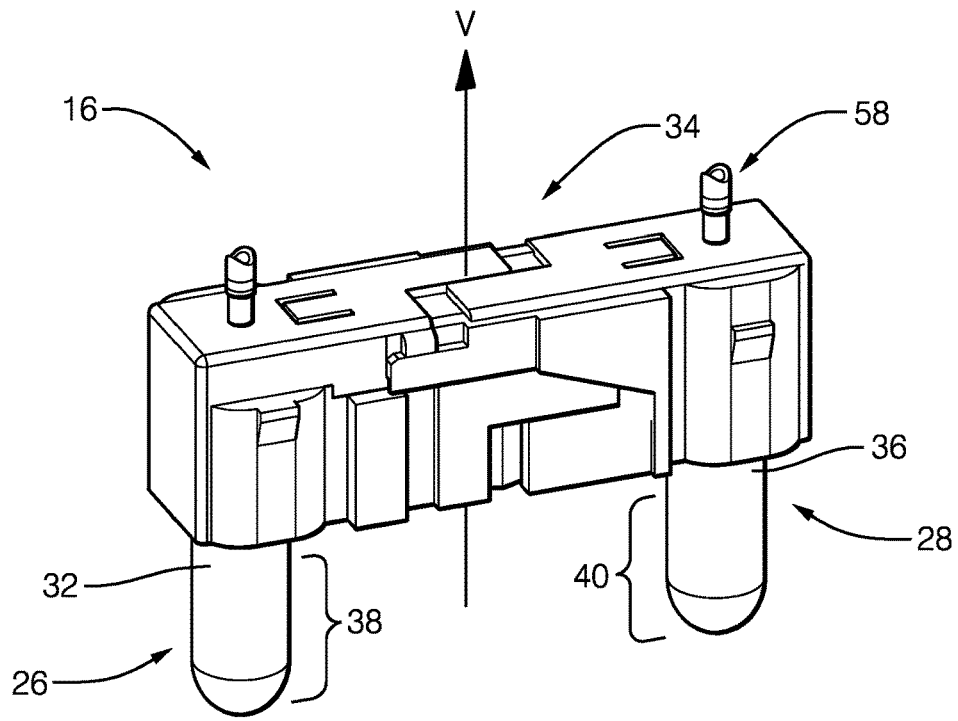
FIG. 2 is a perspective schematic view of a first embodiment of an electrical connection shunt designed to electrically connect the battery elements of FIG. 1.
Figure 3:
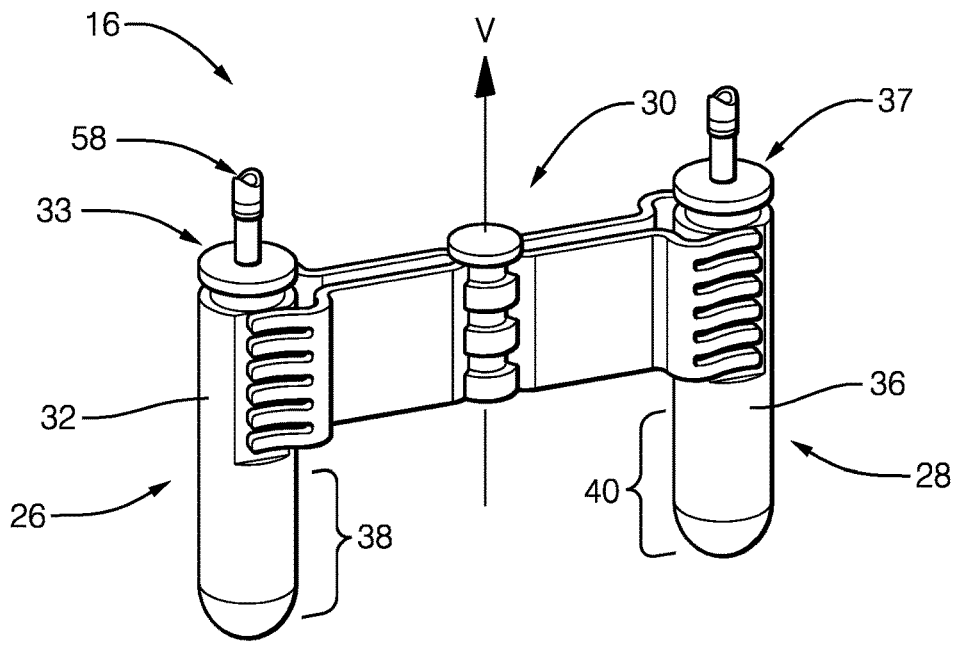
FIG. 3 is a perspective schematic view of the shunt according to FIG. 2 without its plastic housing element.

According to FIGS. 2 and 3, an embodiment of the shunt 16 designed to be cooled by the cooling circuit 18 is represented. The shunt 16 comprises electrical conduction elements such as a first electrical connection terminal, hereinafter referred to as the first terminal 26 and a second electrical connection terminal, hereinafter referred to as the second terminal 28 designed to be coupled with a first and a second electrical contact terminal connector, and an electrical coupling element 30 linking the first and second terminals 26, 28.

The first and second terminals 26, 28 are composed of an electrically conductive metal rod 32, 36 housed in an electrically insulating housing element, hereinafter referred to as the housing element 34. Preferably, each rod 32, 36 is overall of cylindrical form. The housing element 34 can be overmolded on the rods 32, 36 or the rods 32, 36 can be force-fitted into the housing element 34.

Each rod 32, 36 extends along the vertical axis V. Each rod 32, 36 comprises a bottom portion allowing the coupling of the rod 32, 36 with an electrical contact terminal connector. The bottom portion of the rod 32, 36 is hereinafter referred to as the contact end 38, 40. In this example, the contact end 38, 40 is an overall cylindrical male part complementing a female part located on an electrical contact terminal connector. In other words, according to the embodiment represented, the first terminal 26 and the second terminal 28 are male terminals. The top portions of the rods 32, 36 are linked electrically to one another by the electrical coupling element 30.

According to FIG. 4, the first and second terminals 26, 28 comprise an open-ended conduit, hereinafter referred to as the shunt conduit 42, 44, designed to have the coolant flow through each rod 32, 36. Each shunt conduit 42, 44 extends along the vertical axis from the top end 33, 37 of each rod 32, 36 to an internal cavity 46, 48 of the contact end 38, 40, each internal cavity 46, 48 emerging on the bottom free end 50, 52 of each rod 32, 36. In other words, each shunt conduit 42, 44 extends vertically rectilinearly from the top end 33, 37 of the first and second terminals 26, 28 of the shunt 16 to the internal cavity 46, 48 of each contact end 38, 40, said internal cavities 46, 48 being in fluid continuity with the shunt conduits 42, 44. Each shunt conduit 42, 44 therefore comprises an end, hereinafter referred to as the joining end 54, 56 with the internal cavity 46, 48. Each shunt conduit 42, 44 is an open-ended conduit, that is to say a conduit comprising an aperture at each of its ends.

The top end 33, 37 of each rod 32, 36 therefore comprises an aperture making it possible to introduce the coolant into each shunt conduit 42, 44.

Each internal cavity 46, 48 is designed to receive a piece for guiding and holding the shunt 16 in an electrical contact terminal connector. Preferably, the shunt conduit 42 has a constant aperture diameter smaller than the aperture diameter of the internal cavity 46.

So as to simplify the fixing of an end of the supply coolant pipe 20 of the shunts 16, a shunt interconnection means 58 between the shunt conduit 42 and the supply coolant pipe 20 is arranged on the top end 33 of the first and second terminals 26, 28 of the shunt 16. Preferably, the shunt 16 interconnection means 58 can be a pipe fixing means of collar type, inserted by screw-fastening into the shunt conduit 42. Obviously, for the purposes of accessibility each shunt interconnection means 58 is arranged through an aperture of the housing element 34 covering the top end 33 of the first and second terminals 26, 28.

Alternatively, the shunt conduit 42 can also be arranged through the electrical coupling element 30 linking the first and second terminals 26, 28.

The first and second terminals 26, 28 can also not have an internal cavity 46, 48 arranged at the contact end 38, 40 of the first and second terminals 26, 28. In this other embodiment, each shunt conduit 42, 44 arranged in the first and second terminals 26, 28 then extends from the top end 33, 37 of each rod 32, 36 to the bottom free end 50, 52 of each rod 32, 36. According to this particular embodiment, it is possible to consider arranging, at the bottom end of the shunt conduit 42, a shunt interconnection means 58, preferably identical to that arranged on each top end 33, 37 of the shunt 16, so as to be able to easily fix thereto the return coolant pipe 22 for the fluid having passed through the shunt 16. In this particular case, the first and second terminals 26, 28 of the shunt 16 are therefore designed to be inserted into an electrical terminal connector not comprising any piece for guiding and holding the shunt 16 in the electrical contact terminal connector.

It should be noted that the use of the interconnection means 58 for fixing the supply coolant pipes 20 and return coolant pipes 22 makes it possible to simplify this interconnection. It is possible to consider not arranging these interconnection means 58 on the shunt 16, so that, for example, the end of each supply coolant pipe 20 and each return coolant pipe 22 is force-inserted into each shunt conduit 42, 44.

More economically, it is possible to consider not connecting supply coolant pipes 20 and return coolant pipes 22 to the shunt conduits 42, 44. A natural air convection through the shunt conduits 42, 44 could, in some cases, suffice for the cooling of the shunt 16.

The arrangement of shunt conduits 42, 44 is not limited to the shunts comprising the first and second terminals 26, 28 of male type. Indeed, it is also possible to consider arranging shunt conduits 42, 44 through electrical connection terminals of female type. The important thing is to arrange the shunt conduits 42, 44 through at least one conduction element of the shunt 16 that is passed through by an electrical current that can cause the heating of the shunt 16.

According to FIG. 5, an embodiment an electrical contact terminal connector, hereinafter referred to as the terminal connector 60, designed to receive an electrical connection terminal of the shunt 16 is represented. The terminal connector 60 represented is an electrical terminal connector comprising a female electrical terminal, hereinafter referred to as the coupling terminal 62. The terminal connector 60 is also designed to allow the discharge of the coolant that can flow through the shunt 16.

The terminal connector 60 comprises, from top to bottom, an attachment element 64, preferably of plastic, designed to fix the terminal connector 60 to a battery element 11, the coupling terminal 62, an electrically conductive bus bar 66 designed to conduct the electrical current from a battery element 11 to the coupling terminal 62 and a plastic housing 68 designed to cover the coupling terminal 62.

More specifically, the attachment element 64 comprises a first planar horizontal plate, hereinafter referred to as the first plate 70, comprising a central aperture 72 designed for the insertion of a first terminal 26 of the shunt 16 in the coupling terminal 62. The first plate 70 provides electrical insulation above the terminal connector. The first plate 70 is equipped on one of its edges with a hollow tongue 74 extending along the vertical axis V upwards and allows the attachment of the terminal connector 60 onto a snug. The first plate 70 is also equipped with snugs arranged on an edge of the first plate 70 and extending along the vertical axis V downwards so as to be able to fix the first plate 70 with the plastic housing 68.

The central aperture 72 of the first plate 70 is of a diameter substantially identical to the diameter of each rod 32, 36 of the first and second terminals 26, 28 of the shunt 16. The central aperture 72 comprises an annular wall 76 extending along the vertical axis V from the top face of the first plate 70 to its bottom free end arranged beyond the bottom face of the first plate 70, thus forming a ring 78 under the first plate 70.

The coupling terminal 62 or female terminal is a terminal of tulip type comprising a plurality of elastic contact fingers 80 extending along the vertical axis V downwards from an annular base 82 to their bottom free end forming a female contact sleeve 84. The annular base 82 is designed to be assembled around the ring 78 of the first plate 70 of the attachment element 64. Each contact finger 80 is curved axially towards the interior of the coupling terminal 62 so that the internal diameter of the female contact sleeve 84 of the coupling terminal 62 is smaller than the diameter of the central aperture 72 of the first plate 70 in order for the elastic contact fingers 80 to be able to come into electrical contact with the contact end 38 of a rod 32 of the shunt 16 when the latter is inserted into the terminal connector 60.

The bus bar 66 comprises a first portion 86 designed to be fixed onto the coupling terminal 62 and a second portion 88 designed to be fixed onto a positive pole or a negative pole of a battery element 11.

The first portion 86 is a second planar horizontal plate comprising a circular aperture 90. The circular aperture 90 comprises a circular wall extending along the vertical axis V upwards from the top face of the first portion 86 to its top free end arranged beyond the top face of the first portion 86, thus forming a ring 92 on the first portion 86. The ring 92 is designed to be inserted around and in contact with the annular base 82 of the coupling terminal 62 so as to conduct the electrical current from a battery element 11 to the coupling terminal 62 and therefore to the rod 32 of the shunt 16 when the latter is inserted into the terminal connector 60. In other words, the diameter of the ring 92 is slightly greater than the diameter of the annular base 82 of the coupling terminal 62, so that the ring 92 is designed to be friction-fitted around the annular base 82 of the coupling terminal 62.

The second portion 88, in continuity with the first portion 86, is a planar vertical plate extending along the vertical axis V downwards from an edge of the second horizontal plate to its bottom free end.

The plastic housing 68 is a cylindrical housing comprising a housing bottom 94 and a top aperture 96 with a surface area dimension identical to the housing bottom 94. The top aperture 96 is a circular aperture comprising a planar flange 97 designed to come to bear against the bottom face of the first portion 86 of the bus bar 66. The top aperture 96 of the plastic housing 68 is of a diameter equivalent to the diameter of the ring 92 of the first portion 86 of the bus bar 66.

The housing bottom 94 is provided with an aperture emerging on a duct 98 oriented along the vertical axis V downwards so as to allow the discharge of the coolant passing through the terminal connector 60. The duct 98 therefore extends from the housing bottom 94 to its bottom end 100. The duct 98 therefore comprises a guiding duct conduit making it possible to guide the coolant to its bottom end 100.

So as to simplify the fixing of an end of the return coolant pipe 22 to the bottom end 100 of the duct 98 of the terminal connector 60, a terminal connector interconnection means 102 is arranged on the bottom end 100 of the duct 98. Preferably, the terminal connector interconnection means 102 can be a pipe fixing means of collar type, inserted by screwing into the duct 98 of the terminal connector 60. Preferably, the terminal connector interconnection means 102 is identical to the shunt interconnection means 58.

According to FIG. 6, the bottom of the plastic housing 94 comprises a hollow piece 104 for guiding and holding the shunt 16 in the terminal connector 60. The hollow piece 104 extends along the vertical axis V upwards from the housing bottom 94 to its free end arranged in the female contact sleeve 84 of the coupling terminal 62. The hollow piece 104 is arranged coaxially with the duct 98.

The hollow piece 104 is arranged in fluid continuity with the conduit of the duct 98 so as to form an open-ended conduit distinct from the shunt conduit 42 and hereinafter referred to as the terminal connector conduit 106. The terminal connector conduit 106 is designed to make the coolant flow through the terminal connector 60 so as to recover the fluid having flowed in the shunt 16 when the latter is coupled to the terminal connector 60. The conduit of each terminal connector conduit 106 extends along the vertical axis V from the top end 108 of each hollow piece 104 to the bottom end 100 of each duct 98. In other words, the terminal connector conduit 106 extends vertically rectilinearly from the top end 108 of each hollow piece 104 to the terminal connector interconnection means 102.

The top end 108 of the hollow piece 104 of a terminal connector 60 therefore comprises an aperture making it possible to recover the coolant originating from the joining end 54 of a shunt conduit 42 when the hollow piece 104 is inserted into the internal cavity of the first terminal 26 of the shunt 16.

According to this embodiment, the hollow piece 104 of the terminal connector 60 is provided with an annular seal 110. The annular seal 110 is arranged around the hollow piece 104 and is designed to be tightly compressed between the internal cavity 46 of the first terminal 26 and the hollow piece 104 so that, when the first terminal 26 of the shunt 16 is inserted into the terminal connector 60, the shunt conduit 42 and the terminal connector conduit 106 are protected against any ingress of dust and also so that the coolant passes only between the shunt conduit 42 and the terminal connector conduit 106 without loss of fluid at the joining end 54 of the first terminal 26.

According to another embodiment, the terminal connector 60 can be a simple conductive ring designed to be inserted around the first terminal 26 of male type. The conductive ring can comprise at least one metal extension allowing it to be fixed onto a positive or negative pole of a battery element 11. The ring can also comprise a terminal connector conduit 106 that can be arranged, for example, through the thickness of the ring. According to this embodiment, the electrical terminal connector has neither the attachment element 64, nor the plastic housing 68 and nor does it have the bus bar 66 of the terminal connector 60 of FIG. 5.

According to an alternative embodiment, the electrical contact terminal connector can be a terminal connector comprising electrical coupling terminals of male type so as to be able to be coupled electrically to female electrical connection terminals of a shunt. Preferably, each electrical connection or coupling terminal can comprise a duct designed to have a flow of coolant.

Figure 7:
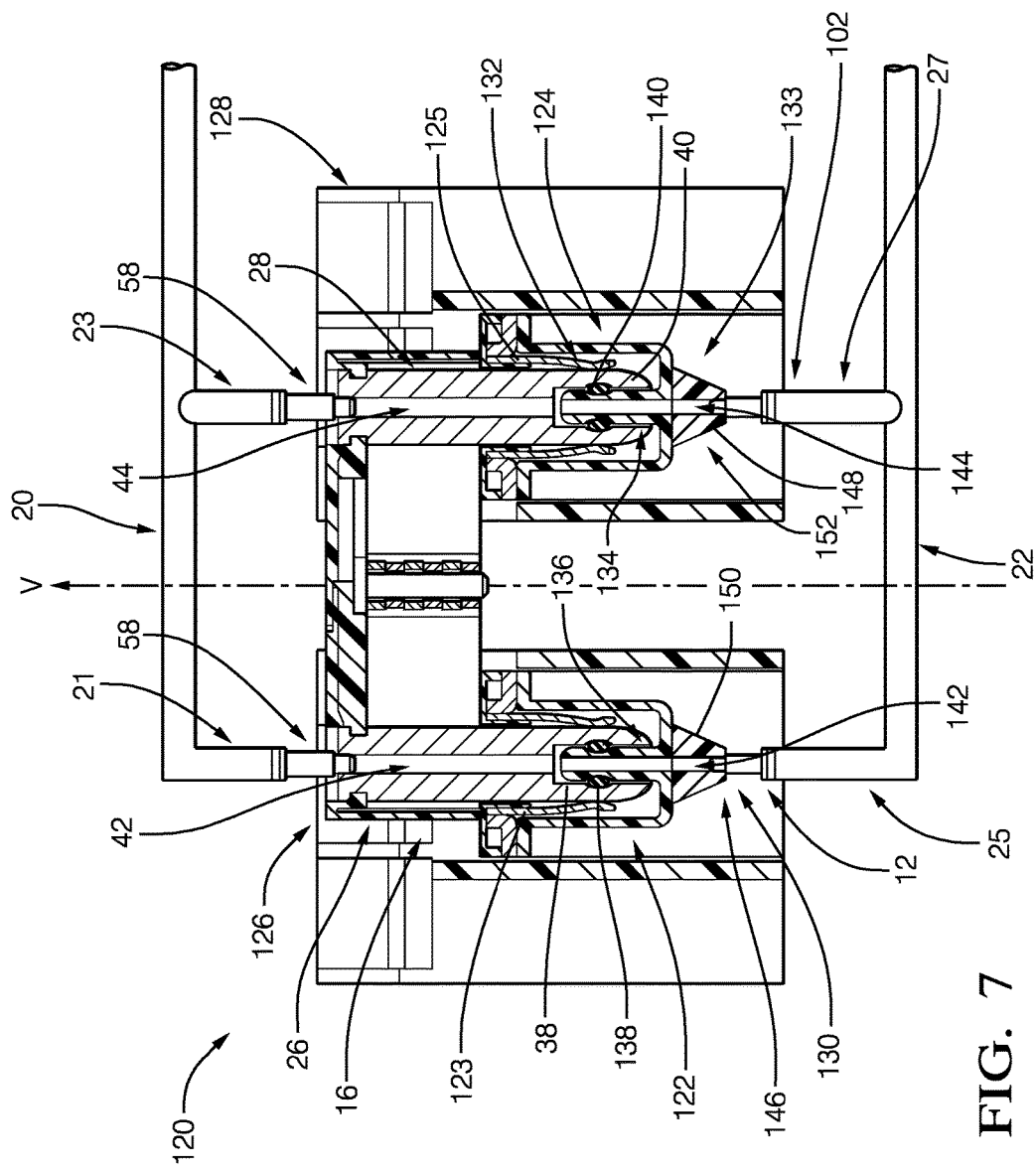
FIG. 7 is a schematic view in axial cross section of an embodiment of the electrical assembly of the electrical connection shunt according to FIG. 2 with two electrical contact terminal connectors according to FIG. 5.

According to FIG. 7, an embodiment of an electrical assembly 120 of the shunt 16 with two electrical contact terminal connectors 122, 124 is represented. The shunt 16 is inserted into the two electrical contact terminal connectors 122, 124. More particularly, the first terminal 26 and the second terminal 28 of the shunt 16 are coupled electrically with a first electrical contact terminal connector 122 and a second electrical contact terminal connector 124. The first and the second electrical contact terminal connectors 122, 124 are identical to the terminal connector 60 described in FIGS. 5 and 6. The first electrical contact terminal connector 122 is fixed to a first battery element 126, whereas the second contact terminal connector 124 is fixed to a second battery element 128. More particularly, the bus bar 130 of the first electrical contact terminal connector 122 is coupled electrically to a pole of a determined polarity of the first battery element 126, for example a positive pole, and the bus bar 133 of the second electrical contact terminal connector 124 is coupled electrically to a pole of the second battery element 128 of a polarity complementary to that of the pole of the first battery element 126 coupled to the bus bar 130 of the first electrical contact terminal connector 122, namely, for example, a negative pole.

According to this embodiment, the first and second terminals 26, 28 are inserted into an electrical coupling terminal 130, 132 so that the elastic contact fingers 123, 125 of each electrical coupling terminal 130, 132 comes into contact with the contact end 38, 40 of the first and second terminals 26, 28. The internal cavity 46, 48 of each contact end 38, 40 is inserted around each guiding piece 134, 136 of each of the two electrical contact terminal connectors 122, 124 so that each annular seal 138, 140 arranged around each guiding piece 134, 136 is compressed between the walls of the internal cavity 46, 48 and each guiding piece 134, 136. This arrangement allows each terminal connector conduit 142, 144 to be in fluid continuity with each shunt conduit 42, 44, each shunt conduit 42, 44 and each terminal connector conduit 142, 144 being rectilinear.

The shunt conduit 42, 44 of the first and second terminals 26, 28 of the shunt is fed with coolant by the supply coolant pipe 20, the supply coolant pipe 20 comprising a first supply branch 21 and a second supply branch 23 so as to respectively supply the first and second terminals 26, 28. The first and second supply branches 21, 23 are fixed onto each shunt conduit 42, 44 by the shunt interconnection means 58 arranged on the first and second terminals 26, 28. The coolant passing through the first and second terminals 26, 28 is recovered via each terminal connector conduit 142, 144 by the return coolant pipe 22. More particularly, the return coolant pipe 22 comprises a first return branch 25 and a second return branch 27 respectively fixed via the terminal connector interconnection means 102 to the bottom end 150, 152 of each duct 146, 148, that is to say to the bottom end of each terminal connector conduit 142, 144. Preferably, the terminal connector interconnection means 102 are identical to the shunt interconnection means 58.

According to a particular embodiment, it is possible to consider having the electrical assembly 120 include a shunt of which a single electrical connection terminal comprises a shunt conduit, and of which only the electrical contact terminal connector coupled to the electrical connection terminal comprising the shunt conduit comprises a terminal connector conduit.

According to another embodiment, it is possible to consider having assembly 10 comprise a shunt whose electrical connection terminals of male type do not comprise an internal cavity and whose electrical contact terminal connectors are simple conductive rings comprising at least conductive means for attachment with the poles of the battery elements. According to this other embodiment, it is therefore possible to consider having the electrical contact terminal connectors not comprise shunt conduits and at least one of the two electrical connection terminals of male type of the shunt comprise a shunt conduit extending from the top end of the rod to the bottom end of the rod of the electrical connection terminal. The interconnection means with the coolant pipes can be arranged on both ends of each shunt conduit. In this other embodiment, it should be noted that the electrical contact terminal connector comprises either attachment element nor bus bar and nor does it have plastic housing as illustrated in FIG. 5.

The invention is not limited to the use of the shunt 16 and of the terminal connector 60 described for coupling positive and negative poles of battery elements 11 to one another. The shunt 16 and the terminal connector 60 according to the invention can be used in any other application requiring the electrical coupling of two elements for which an electrical current has to pass from one element to the other element.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. Moreover, the use of the terms first, second, etc. does not denote any order of importance, but rather the terms first, second, etc. are used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, directional terms such as upper, lower, etc. do not denote any particular orientation, but rather the terms upper, lower, etc. are used to distinguish one element from another and establish a relationship between the various elements.

We claim:

1. An electrical connection shunt assembly, comprising:
an electrically conductive terminal configured to be coupled with a first electrical contact terminal connector having a shunt conduit configured to have a coolant flow therethrough and extending through a central portion of the terminal, wherein a first end of the shunt conduit is terminated by a first shunt interconnection means and a second end is terminated by a cavity having a diameter larger than the shunt conduit;
an electrically conductive coupling element in direct contact with the terminal; and
an electrically insulating housing in which the coupling element is disposed, said housing comprising a hollow piece defining a terminal connector conduit configured to have the coolant flow therethrough and extending through a central portion of the hollow piece, wherein the hollow piece is received within the cavity of the terminal, and wherein a first end of the terminal connector conduit is in fluid communication with the shunt conduit and a first end of the terminal connector conduit is terminated by a first shunt interconnection means.

2. The electrical connection shunt assembly according to claim 1, wherein the terminal is a male electrical connection terminal comprising a cylindrical contact end configured to be inserted into the coupling element.

3. The electrical connection shunt assembly according to claim 1, wherein the shunt conduit is a rectilinear conduit.

4. The electrical connection shunt assembly according to claim 1, further comprising an annular seal arranged about the hollow piece and in compressive contact with the hollow piece and the cavity.

5. The electrical connection shunt assembly according to claim 1, wherein the electrically conductive coupling element has a plurality of elastic contact fingers extending from an annular base in direct contact with the terminal.

6. The electrical connection shunt assembly according to claim 5, wherein the hollow piece extends between the plurality of elastic contact fingers of the contact element.

7. The electrical connection shunt assembly according to claim 1, further comprising a bus bar electrically connected to the coupling element.

8. The electrical connection shunt assembly according to claim 1, wherein the housing is formed of a plastic material.

\* \* \* \* \*